June 17, 1958 S. W. BROADHURST ET AL 2,839,610

APPARATUS FOR THE RECEPTION OF PULSE CODED INFORMATION

Filed Feb. 23, 1955 4 Sheets-Sheet 1

INVENTORS
SIDNEY WALTER BROADHURST AND LIONEL ROY FRANK HARRIS

BY Hall and Houghton
ATTORNEYS

APPARATUS FOR THE RECEPTION OF PULSE CODED INFORMATION

Filed Feb. 23, 1955 4 Sheets-Sheet 2

SIDNEY WALTER BROADHURST AND LIONEL ROY FRANK HARRIS
INVENTORS

BY Hall and Houghton
ATTORNEYS

June 17, 1958 S. W. BROADHURST ET AL 2,839,610

APPARATUS FOR THE RECEPTION OF PULSE CODED INFORMATION

Filed Feb. 23, 1955 4 Sheets-Sheet 3

SIDNEY WALTER BROADHURST AND LIONEL ROY FRANK HARRIS

INVENTORS

BY Hall and Houghton

ATTORNEYS

June 17, 1958 S. W. BROADHURST ET AL 2,839,610

APPARATUS FOR THE RECEPTION OF PULSE CODED INFORMATION

Filed Feb. 23, 1955 4 Sheets-Sheet 4

SIDNEY WALTER BROADHURST AND LIONEL ROY FRANK HARRIS

INVENTORS

BY Hall and Houghton

ATTORNEYS

United States Patent Office 2,839,610

Patented June 17, 1958

2,839,610

APPARATUS FOR THE RECEPTION OF PULSE CODED INFORMATION

Sidney Walter Broadhurst, Kingsbury, London, and Lionel Roy Frank Harris, Kenton, England Application February 23, 1955, Serial No. 489,994

Claims priority, application Great Britain February 24, 1954

11 Claims. (Cl. 179—18)

This invention relates to apparatus for the reception and detection of pulse coded information and in particular it relates to the reception of dialled impulses as used in automatic telephony although its use is by no means restricted to this and in particular the invention finds application in the reception of telegraph signals.

A feature of many communication systems is that information is transmitted in the form of coded pulses so that the information presented to a receiver over an input lead comprises a sequence of changes of the input lead from one state to another, the state of the input lead remaining undisturbed between changes. The receiver thus has to detect patterns of changes of state on the input lead.

A further feature of many communications systems is that a plurality of sources of information each using the same code are connected to a central communication or switching centre where each source may be permanently or temporarily associated with a receiver.

For example in many telephone switching systems the designation information identifying the wanted subscriber or service is received in the form of signals from a dial. These signals normally comprise a series of trains of impulses, each train consisting of disconnections of the calling line circuit corresponding in number to the particular digit of the number being called. In most telephone switching systems the signals are detected by electromechanical means which include devices for counting the number of disconnections in each train of impulses, means for determining the beginning and end of successive impulse trains and means for distinguishing an impulse from the line disconnection forming a release signal when a caller abandons a call. These means are individual to each source of information actually transmitting and are generally known as impulsing circuits and are well known to those skilled in the art, for example the A, B and C relay circuits.

In many cases the impulsing circuits directly control the positioning of selecting means over which the call is to be established. In other cases the designation information is received and possibly stored by a common device such as a register, the register impulsing circuits controlling the storage and distribution of the information which is then either converted into other types of signal suitable for controlling the selecting means or converted into a different series of simulated dial signals for the purpose of translating the number dialled by the caller into a number more convenient to route the call to its destination.

With electromechanical impulsing circuits the timing of dial signals involves careful relay adjustment and narrow tolerances on timing owing to the insensitivity of the electromechanical apparatus. Hence signal generators such as dials have to operate within narrow margins of speed and impulse ratio and in cases where these factors are further distorted by the conditions of the line over which the impulses are transmitted, circuit arrangements for their regeneration have to be introduced.

It is known to improve the operation of impulse detecting circuits by means of a substitution of more sensitive electronic means for the electromechanical ones. It is a feature of this invention that the means for detecting the presence and absence of dial signals on any particular circuit and the impulsing circuits corresponding to say the B and C relays should be provided in such a manner that one set of electronic common control apparatus will serve to check, count and time the dial impulses received over a plurality of circuits.

According to the present invention there is provided apparatus for the reception of pulse coded information from a number of sources in which information from any one source is received only at a predetermined time in a recurring time cycle and in which means are provided for distinguishing between coded information pulses and spurious signals and for recoding said pulses in a desired form for transmission over at least one output lead.

The information may be received by the apparatus over a lead common to all sources.

The apparatus may form part of a time division multiplex communication system and the received information may be designation information concerning a wanted connection. In that case the pulses form a pulse train in the series of pulse trains used in the system. The designation information may be transmitted in the form of dialling impulses in which case means are provided for modulating the pulses of one of the pulse trains of the system by the dialling impulses.

These and other features of the invention will be made clearer by the following description of embodiments of the invention which are used in the reception of dial impulses from incoming circuits in a telephone exchange and it is convenient to associate the first embodiment with the invention described in the specification of copending application Serial No. 471,073 in the name of L. R. F. Harris, filed November 24, 1954, in which a common control for a telephone exchange is disclosed.

Of the accompanying drawings which show the embodiments,

Figure 6:
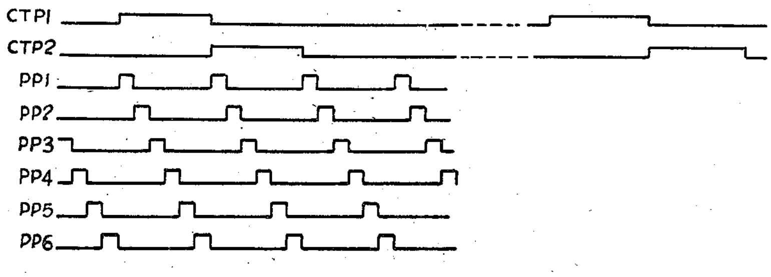
Figure 3:
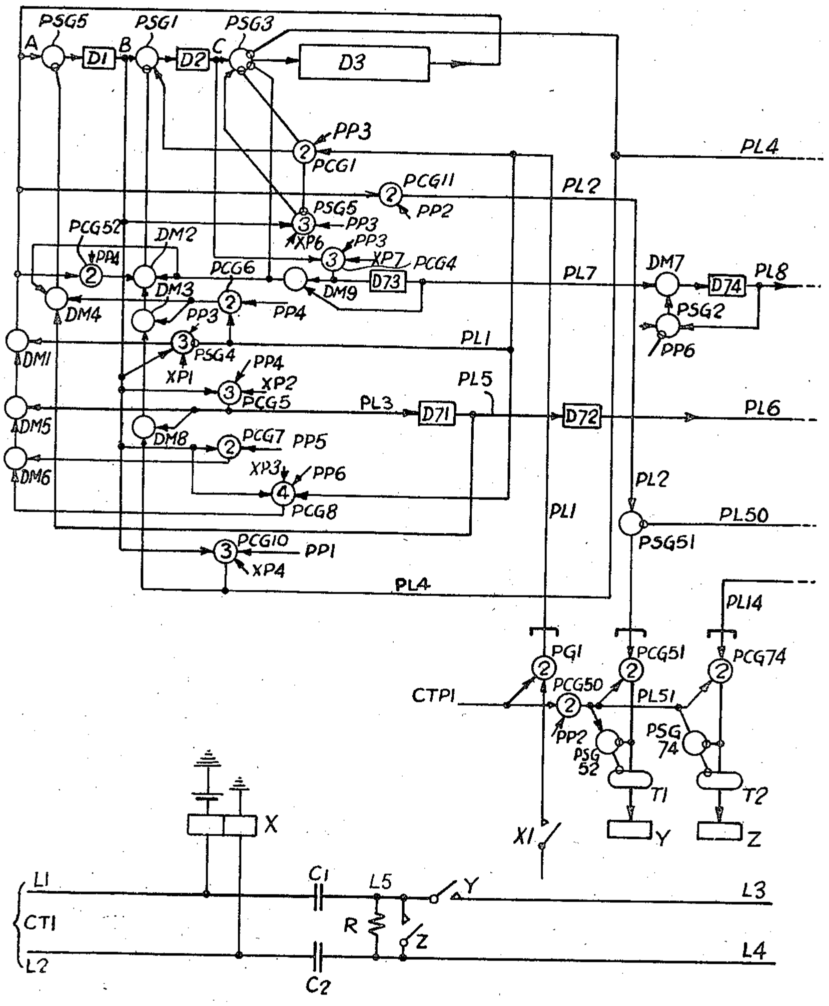
Figures 4, 5:
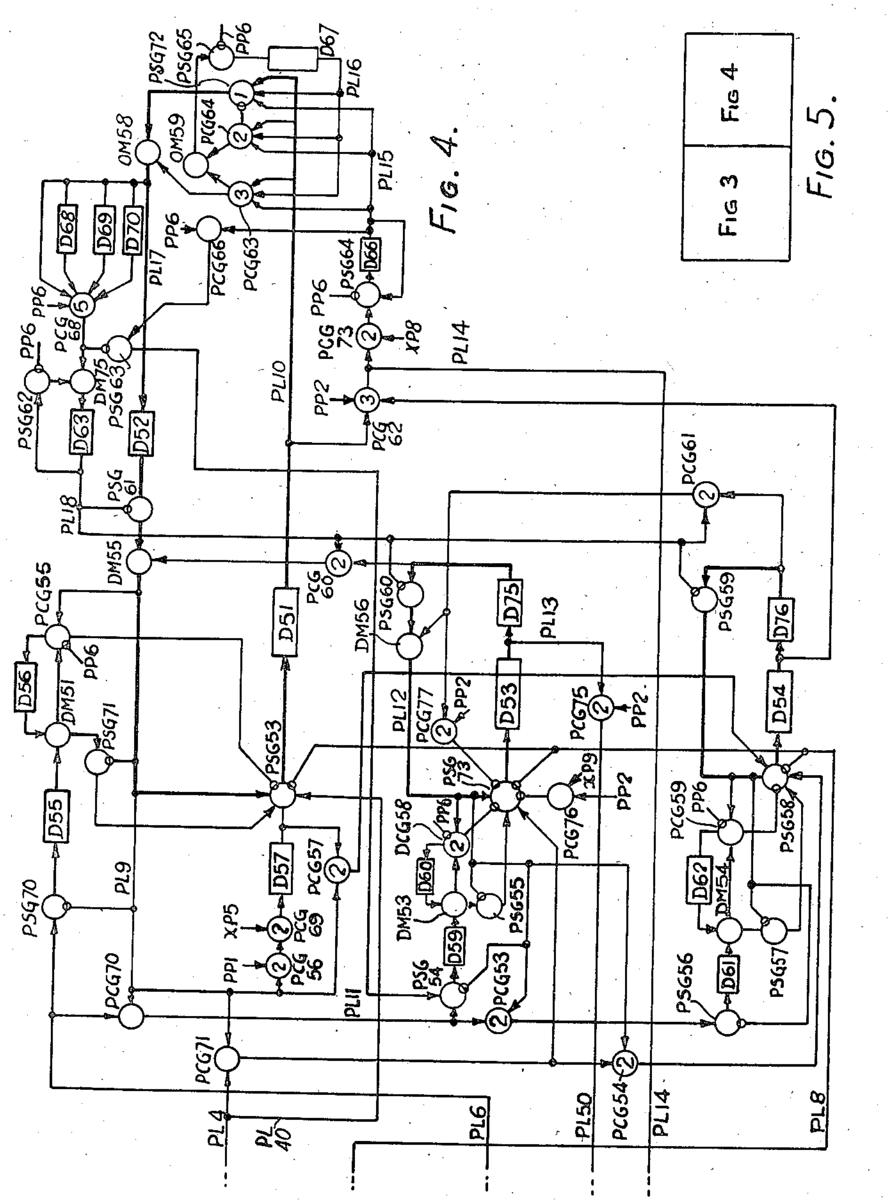

Figs. 3 and 4 when assembled as shown in Fig. 5 show a block schematic circuit diagram of a second embodiment and Fig. 6 shows the waveforms of pulse trains used in Figs. 3 and 4.

Figure 1:
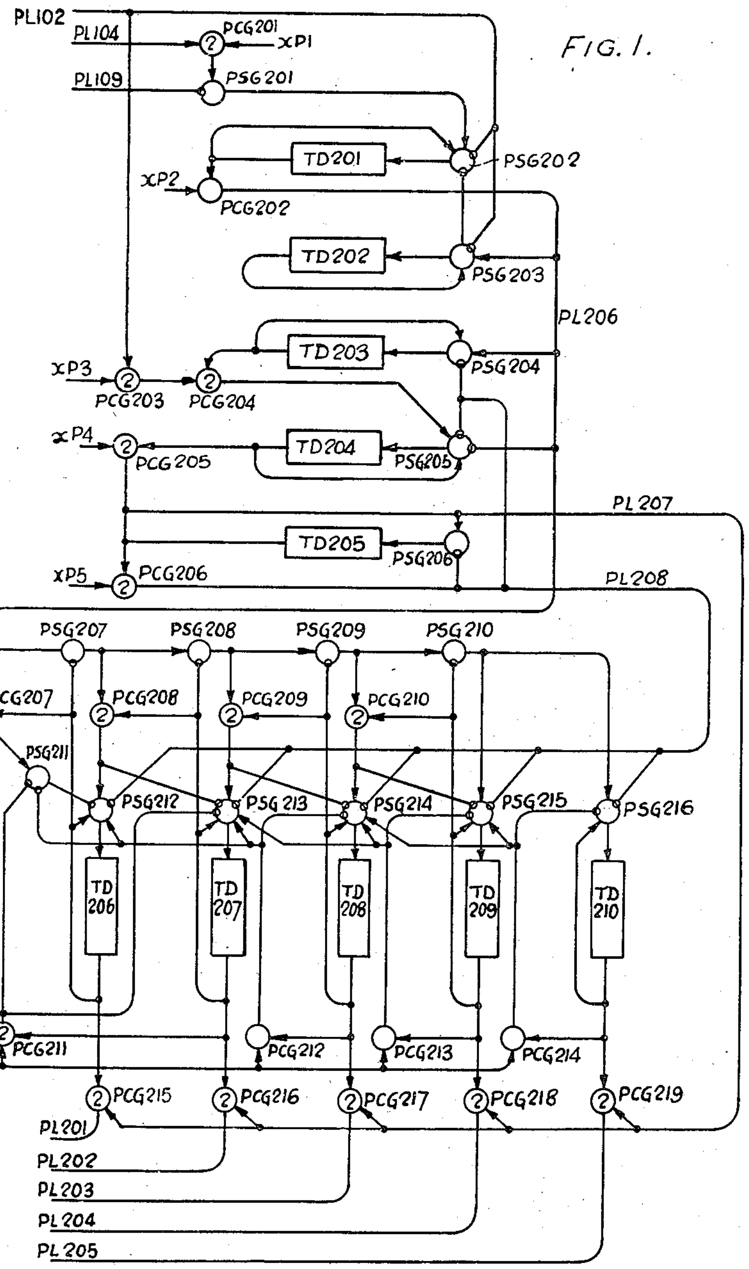
Fig. 1 is a block schematic circuit diagram of a first embodiment.

The facilities provided by the embodiment shown in Fig. 1 include response to interruptions in the subscriber calling signal only in the presence of a signal from elsewhere in the common control unit indicating that the calling signal has been detected and if VF signals are not to be detected; counting of the number of impulses in each train of impulses and indicating the digit in the form of a two out of five code signal, detection of the intertrain pause and release of the digit to a storage elsewhere in the common control—and release of the circuit under a number of different conditions.

Figure 2:
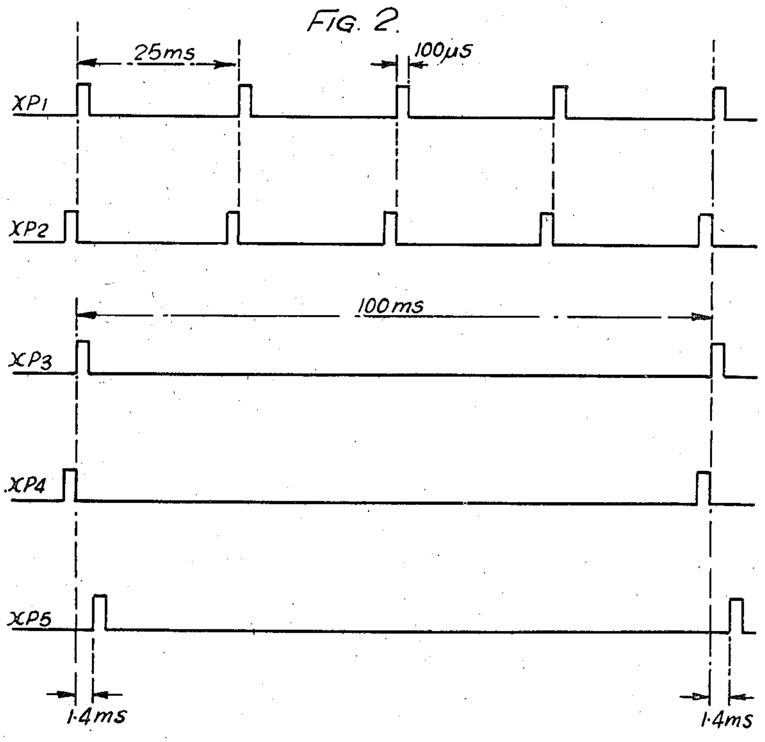
Fig. 2 shows the waveforms of pulse trains used in Fig. 1.

The following description refers to Figs. 1 and 2 of the drawings in which circuit operations for each of a plurality of incoming circuits are performed using a number of timing devices and associated gate circuits in which each incoming circuit is characterised by the register pulse train of the register to which it is temporarily connected.

The subscriber calling signal after transmission through the exchange switch network is received on pulse lead PL102 as a pulse train. A number of such pulse trains may exist together on PL102 each train being associated with one register. The operation of the impulse apparatus is described with relation to one register pulse train, but it is to be understood that the operation may be performed simultaneously—on a time division basis—on all or any of the number of pulse trains referred to, different trains not being necessarily in the same phase in the sequence of operations.

In the present example, each pulse train has a pulse repetition frequency of 10 kc./s. and pulse length 1.01 μs., 99 such pulse trains may therefore exist on one pulse lead. Also, in the present example is a timing device capable of generating any register pulse train or combination of register pulse trains.

Detection elsewhere in the register of a subscriber calling signal initiates a backward hold signal which in addition to passing through the exchange switch network is received on lead PL104 in the form of a register pulse train corresponding to the calling signal. That pulse train is applied to pulse coincidence gate PCG201 and in coincidence with a timing pulse train XP1 causes a pulse to be sent via pulse suppression gate PSG201 to PSG202. In the event of V. F. signals being received elsewhere in the register, PSG201 is inhibited by the register pulse train on PL109. An output from PSG202 causes timing device TD201 to generate the register pulse train concerned when the register pulse train on PL102 is suppressed by a dial break impulse.

Timing pulse trains XP1 and XP2 are used together to time dial impulse periods and to reject spurious breaks of less than half of the minimum dial impulse period to be received. A timing accuracy of 2:1 is achieved by the method used so that spurious breaks of less than the duration of a minimum dial impulse will also sometimes be rejected. The accuracy of timing may be increased by increasing the capacity of the timing unit. The waveforms of trains XP1 and XP2 are shown in Fig. 2.

The register pulse train generated by TD201 is applied to PCG202 and in coincidence with XP2 causes a pulse to be applied to PSG203. If the break which initiated the operation is of the length of a genuine dial impulse the register pulse train on PL102 will still be suppressed owing to the break and an output from PCG202 fed to PSG203 will cause TD202 to generate the register pulse train. TD202 will therefore store all dial impulses above a minimum duration. If the break is of a shorter duration than a minimum dial impulse subject to the timing accuracy referred to above, PSG203 will be inhibited by the reappearance of the register pulse train on PL102 which will also inhibit both PSG202 and PSG203 and so prevent further generation of the register pulse train in TD201 and TD202.

Generation of the register pulse train by TD202 causes PSG202 to be inhibited by an output from PSG203 and TD201 ceases to generate the register pulse train. The pulse from PCG202, in addition to the above is also presented to PSG204, PSG205 and, via PL206, to PSG207 and PCG207. From PSG204 an output causes generation in TD203 of the register pulse train which is used to indicate that a train of dial impulses has commenced.

Timing pulses XP3 and XP4 are used together to time—to an accuracy of 2:1 as in the case of XP1 and XP2—the make period between dial impulses that is used to indicate an intertrain (interdigit) pause. At the end of the dial impulse period the register pulse train will be restored to PL102, and will cause TD202 to be reset at PSG203. The register pulse train is also applied to PCG203 and in the event of coincidence with pulse train XP3 (Fig. 2) an output from PCG203 will pass through PCG204 in coincidence with the register pulse train generated by TD203 and presented to PSG205 will cause TD204 to generate the register pulse train. XP3 will not necessarily coincide with the register pulse train from PL102 during the make period between two dial impulse breaks of the same digit impulse train. If the make period is between two breaks of the same digit impulse train the register pulse train will be suppressed on PL102 and so, by the action of TD201 and XP1 and XP2 as before, will inhibit PSG205 by a pulse on PL206. This inhibition will reset TD204 before coincidence with XP4 in PCG205 can occur. The pulse from PCG202 on PL206 is also as before applied to PSG207 and PCG207 to indicate that a second break has been received. This operation is repeated for each subsequent dial impulse of the same digit impulse train until an intertrain pause is detected and a single pulse is transmitted for each break period to the gates PSG207 and PCG207.

When an intertrain pause occurs, TD204 will be caused to generate the register pulse train as before by the operation of the register pulse train on PL102, XP3, PCG203, PCG204 and the register pulse train generated by TD203. The pulse train applied to PCG205 will at some time coincide with XP4 and an output from PCG205 via PSG206 will cause TD205 to generate the register pulse train. This register pulse train on lead PL207 is applied to PCG215, PCG216, PCG217, PCG218, and PCG219 to "gate out" a stored digit to elsewhere in the register on leads PL201, PL202, PL203, PL204, PL205. The register pulse train from TD205 is also applied to PCG206 and at a later time coincides with a pulse train XP5 (Fig. 2) causing an output—on PL208—which is applied to PSG204, PSG205, PSG206, PSG212, PSG213, PSG214, PSG215, and PSG216 as an inhibiting signal causing each of the devices TD associated with these gates i. e. TD204, TD205, TD206, TD207, TD208, TD209, TD210 to be reset if generating the register pulse train. The unit is then prepared to receive another digit.

On PL206 one pulse of the register pulse train is applied to PSG207 and PCG207 for each dial impulse period detected.

The first pulse applied by PL206 to PSG207 and PCG207 is passed via PSG207, PSG209, PSG210 to PSG216 and PSG215. Outputs from these gates cause TD210 and TD209 to generate the register pulse train, indicating that digit one has been stored. If gates PCG215—219 were now opened, PL205 and PL204 only would be energised by the register pulse train to indicate to a unit elsewhere in the register that digit one had been received, each digit being indicated by combinations of 2 leads out of the 5, PL201–205 transmitting the register pulse train.

The register pulse train from TD209 is applied to PCG213, PCG210 and inhibits PSG210 to prevent a second pulse from passing into TD209 circuit.

The second pulse on PL206 passes through PSG207, PSG208, PSG209 and PCG210 in coincidence with the register pulse train from TD209 to PSG214 an output of which causes TD208 to generate the register pulse train. An output from PCG210 is also applied to inhibit PSG215 and so reset TD209. TD210 and TD208 are now generating and if gates PCG215—219 were opened would indiate that digit two had been received by energising PL203 and PL205 only with the register pulse train.

The register pulse train from TD208 is applied to PCG212—PCG209 and inhibits PSG209 to prevent the next pulse from passing into TD208 circuit.

The third pulse on PL206 passes through PSG207, PSG208 and PCG209 in coincidence with the register pulse train from TD208 to two outputs. One, via PSG213, causes TD207 to generate the register pulse train, and the other, inhibits PSG214 causing TD208 to be reset. TD207 and TD210 are now generating the register pulse train and if gates PCG215—219 were opened would indicate to a distant part of the register that digit 3 had been received by energising only PL202 and PL207 with the register pulse train.

The register pulse train from TD207 is applied to PCG211, PCG208 and inhibits PSG208 to prevent the next pulse from passing into TD207 circuit.

The fourth pulse on PL206 passes through PSG207 and PCG208 in coincidence with the register pulse train from TD207 to two outputs one, via PSG212, causes TD206 to generate the register pulse train—and the other inhibits PSG213 and causes pulse generator TD207 to be reset. TD210 and TD206 are now generating the register pulse train and in the event of gates PCG215—219 being opened would indicate digit 4 to the distant part of the register by energising only PL201 and PL205 with the register pulse train.

The register pulse train from TD206 is applied to PCG207 and inhibits PSG207 to prevent the next pulse from passing into TD206 circuit.

The fifth pulse on PL206 passes through PCG207 in coincidence with the register pulse train from TD206 to two outputs PCG214 in coincidence with the register pulse train from TD210 is applied to both PSG214 and PSG215 and also inhibits PSG216 thereby resetting TD210. Pulses from PSG214 and PSG215 cause TD208 and TD209 to generate the register pulse train. The other output from PCG207 applied via PSG211 inhibits PSG212 and causes TD206 to be reset. TD208 and TD209 are now generating the register pulse train and if gates PCG215—219 were opened would indicate digit 5 to the distant part of the register by energising only PL203 and PL204 with the register pulse train.

The register pulse train from TD208 operates as for digit 2 and is applied to PSG215 and PCG209 and inhibits PSG209 to prevent the next pulse from passing into TD208 circuit.

The sixth pulse on PL206 behaves as the third pulse in causing TD207 to generate and TD208 to be reset. This leaves TD209 and TD207 generating and would indicate to a distant part of the register a digit 6 if gates PCG215—219 were opened.

The pulse train from TD207 is applied to gates PCG211, PCG208 and inhibits PSG208 as in digit 3.

The seventh pulse on PL206 behaves as the fourth pulse in causing TD207 to generate and TD208 to be reset. This operation leaves TD209 and TD206 generating the register pulse train and if gates PCG215—219 were opened PL201 and PL204 would be energised with the register pulse train and so indicate digit 7 to a distant part of the register.

The register pulse train from TD206 is applied to PCG207 and inhibits PSG207 to prevent the next pulse from passing onto TD206 circuit.

The eighth pulse passes through PCG207 as the fifth pulse and on one output in coincidence with the register pulse train generated by TD209 passes through PCG213 and inhibits PSG215 to reset TD209 and is applied to PSG213 and PSG214 to cause TD207 and TD208 to generate the register pulse train. The other output from PCG207 via PSG211 inhibits PSG212 thereby causing TD206 to be reset. TD207 and 208 are thus left generating the register pulse train and would indicate digit 8 to the distant part of the register by energising only leads PL202 and PL203 if gates PCG215—219 are opened.

The register pulse train from TD207 is applied to PCG208, PCG211 and inhibits PSG208 to prevent the next pulse from passing into the circuit of TD207.

The ninth pulse behaves as the sixth and third pulse and passing through PSG207 and PCG208 in coincidence with the register pulse train from TD207 and PSG212 causes TD206 to generate the register pulse train. The other output from PCG208 inhibits PSG213 and so resets TD207. TD206 and TD208 are thus left generating the register pulse train and if gates PCG215—PCG219 were opened would indicate digit 9 to a distant part of the register by energising only PL201 and PL203 with the register pulse train.

The register pulse train from TD206 is applied to PCG207 and inhibits PSG207 as before.

The tenth pulse on PL206 passes through PCG207, and one output via PCG212 in coincidence with the register pulse train from TD208 inhibits PSG214 so resetting TD208 and is also applied to PSG212 and PSG213 to cause TD206 and TD207 to generate the register pulse train and also to inhibit TD211. The other output from PCG207 is applied to PSG211 but is inhibited by an output from PCG212. TD206 and TD207 would indicate digit 10 by energising only leads PL201 and PL202 with the register pulse train if gates PCG215—217 were opened.

In the event of eleven breaks being detected an eleventh pulse will appear on PL206 and will pass through PCG207 in coincidence with the register pulse train from TD206 and PCG211 in coincidence with the register pulse train from TD207 to inhibit on one output PSG213 and to reset TD207, and on the other output from PCG211 to inhibit PSG211 to prevent TD206 from being reset. Thus TD206 alone is generating the register pulse train and if gates PCG215—219 were opened PL201 only would be energised and the signal would be rejected as false by the distant part of the register.

Having counted all breaks in a dial train of impulses as intertrain pause is detected as above and the register pulse train applied by PL207 to PCG215—219 thus gating the digit by combination of two of the leads PL201—205 to a distant part of the register. At a later time as above XP5 in coincidence with the register pulse train from TD205 via PCG206 causes a pulse on PL208 to reset TD203, TD204, TD205 and any of TD206, 207, 208, 209, 210 that are generating the register pulse train. The unit is then prepared to receive another digit. In this embodiment the devices TD may be for example mercury delay lines of delay 100 microseconds.

A second embodiment of the invention will now be described with reference to Figs. 3, 4, 5 and 6. The embodiment comprises a dial impulse regenerator and incorporates a dial impulse receiver using timing devices in which the several bits of information necessary to the circuit operation individual to each line occupy consecutive time positions.

The second embodiment comprises a dial impulse regenerator in which distorted dial impulses transmitted over a plurality of circuits are regenerated in undistorted form by common apparatus using time division multiplex techniques. Figs. 3 and 4 illustrate the embodiment and they may be assembled to form a schematic of the regenerator as shown in Fig. 5.

In this regenerator the several bits of information necessary to the operation individual to each circuit occupy consecutive positions in each of a number of timing devices. A number of such groups of consecutive pulse positions may be stored in a single timing device. In this regenerator six pulse trains perform the function for each circuit and thus the total access time or length of each timing device must be a multiple of six units, where each unit corresponds to a pulse position. For example if 1200 microsecond magnetostriction delay lines are used for the timing devices with 2 microsecond duration pulses the regenerator could be made common to 100 circuits each making use of a period of $2 \times 6$ microseconds every $2 \times 6 \times 100$ microseconds. These periods of time allotted to each circuit coincide with pulse trains which will be referred to as circuit pulse trains and designated CTP1, CTP2 etc. The six pulse trains which each coincide with each circuit pulse train once in every cycle will be referred to as position pulse trains and designated PP1, PP2 . . . PP6, and pulses of these trains occur cyclically in that order. A timing diagram of these pulse trains is shown in Fig. 6.

One circuit CT1 is shown in the Fig. 3 and the description will relate to this circuit it being understood that the operation for the other circuits is similar. It is assumed that each circuit is unidirectional and 2-wire and comprises two incoming leads such as L1 and L2 over which designation information in the form of dial impulse trains is received and two outgoing leads, such as L3 and L4 over which regenerated dial impulse trains are transmitted. L1 is connected, via capacitor C1, lead L5 and relay contact Y in series, to L3, and L2 is connected via capacitor C2 to L4. L5 is connected to L4 via resistor R in parallel with relay contact Z. Current is applied to L1 from negative battery via one of a pair of balanced coils of relay X and earth is applied via the other coil of the relay X to L2. Capacitors C1 and C2 and the balanced coils of relay X form a high pass filter allowing the transmission of voice frequency signals but preventing the transmission of dial impulses from the incoming side L1 and L2 to the outgoing side L3 and L4.

It is assumed that L3 and L4 are connected to a device at the distant end which may be seized and held by the calling loop condition provided by L3, contact Y closed, R and L4 and which responds to the impulsing "make" loop condition provided by L3, contact Y closed, contact Z closed and L4 and the impulsing "break" condition provided by contact Y closed, contact Z open, L3, and L4. Contact Z is provided to give the maximum current for impulsing since the value of resistor R must be sufficiently high to prevent undue attenuation of speech frequencies.

Relay X is operated by a loop extended over leads L1 and L2 of circuit CT1. Relay contact X1 causes a D. C. condition to be applied to the pulse gate PG1 to which pulse train CTP1 is applied so that on the common output lead PL1 of PG1, and all similar pulse gates provided for other circuits, the pulse train CTP1 appears so long as relay X is operated. Thus when CT1 is seized pulse train CTP1 appears on PL1 and it will be interrupted by dial impulses transmitted over CT1. Only when CT1 is released does the pulse train disappear from PL1 for a period longer than a dial impulse break.

The regenerator as shown includes a timing device 1200 microseconds long, comprising three delay lines the first of which, D3, is 1196 microseconds long and whose output A is connected via pulse suppression gate PSG5 to the second delay line D1 of 2 microsecond delay whose output B is connected via pulse suppression gate PSG1 to the third delay line D2 of 2 microsecond delay whose output C is connected via pulse suppression gate PSG3, back to the input of the first delay line D3. This timing device is used for the reception and detection of dial impulse breaks from the circuits as CT1. Each pulse stored in the timing device causes trains of pulses to be generated at A, B and C each train being displaced by one time unit (i. e. 2 microseconds) from the preceding unit. Each stored pulse will be known by the time at which it appears at A. Thus a stored pulse SP1 appears at A at time PP1, at B at time PP2 and at C at time PP3: stored pulse SP2 appears at A at PP2, at B at PP3 and at C at PP4 and so on.

Lead PL1 is connected to pulse coincidence gate PCG1 to which PP3 is applied so that when CT1 is seized, a pulse coincidental with CTP1 and PP3 appears on the output of PCG1 which is connected as an inhibiting lead to pulse suppression gate PSG3 and also as an operate lead to pulse suppression gate PSG1 to which B is connected. As the output of PCG1 is connected as an operating lead to PSG1 the calling signal is stored as SP2 in the timing device coincident with PP2 at A in the timing device. A is connected to pulse coincidence gate PCG11 to which PP2 is applied so that SP2 is transmitted to the output PL2. PL2 is connected via pulse suppression gate PSG51 to pulse coincidence gates associated with each circuit such as PCG51 provided for CT1. A pulse train coincident with CTP1 and PP2 is applied to PCG51 on lead PL51 so that while SP2 is stored and indicated on PL2 and is not inhibited in PSG51 by the appearance of a coincident pulse train on PL50, a pulse train appears on the output of PCG51. That train is applied so as to inhibit PSG52 and thus to operate trigger T1. Unless PSG52 is suppressed, T1 is held restored by the pulses on PL51, the output of pulse coincidence gate PCG50 to which CTP1 and PP2 are applied. T1 operates relay Y which remains operated for as long as T1 is operated. Relay Y operated extends the forward calling loop condition to the distant end via L3, Y contact operated, R and L4 and thus seizes and holds the connection forward.

PL1 is also connected as a suppression lead to pulse suppression gate PSG4 to which B is connected together with PP3 and XP1. XP1 is a pulse train of 1200 microseconds pulse duration and of a repetition time just less than half the minimum probable duration of a distorted dial impulse break indicated on PL1. Thus with SP2 stored and a break appearing, a pulse coincident with PP3 and XP1 is transmitted through PSG4 and via decoupling means DM1 operates the timing device at A to cause SP3 to be stored and to appear at B at time PP4. B is connected to PCG5 to which XP2 and PP4 are also connected. Pulse train XP2 is a pulse train of 1200 microsecond pulse duration, the pulses of which immediately precede those of XP1. Thus if SP3 is stored for a period between an XP1 pulse and an XP2 pulse, an SP3 pulse at time PP4 is transmitted through PCG5 to PL3. When CTP1 appears on PL1 which is also connected to pulse coincidence gate PCG6 to which PP4 is connected, a PP4 pulse is applied via decoupling means DM4 to remove SP4 if present from the timing device at PSG5 and via DM3 and DM2 to remove SP3 at PSG1. Thus CTP1 must be absent from PL1 for the whole of a period between XP1 and XP2 for a pulse to appear on PL3 and this is used to indicate the appearance of a dial impulse break. The pulse on PL3 is applied via decoupling means DM8 to delete SP3 from the timing device at PSG1 and time PP4 and to cause the storage of SP4 at PSG5 via decoupling means DM1 and DM5. SP4 is only deleted upon the reappearance of CTP1 on PL1 as just described. The fact that SP4 is stored prevents SP3 being again stored via pulse coincidence gate PCG52 to which PP4 is applied and which is between A and PSG1 via DM2. This prevents the double indication of a dial impulse break even though the distorted dial impulse break may exceed twice the period between an XP1 pulse and the next XP2 pulse. PL3 is connected via a 4 microsecond delay line D71 to PL5 which is connected via a 2 microsecond delay line D72 to pulse lead PL6 on which one PP1 pulse (coincident with CTP2 not CTP1) appears for each dial impulse break.

B is connected to pulse coincidence gate PCG7 to which PP5 is connected so that the storage of SP4 causes SP5 to be stored via decoupling means DM6, DM5, DM1 and PSG5. The storage of SP5 indicates that a dial impulse break has been received. B is also connected to pulse coincidence gate PCG8 to which XP3, PP6 and PL1 are also connected. XP3 is a pulse train of 1200 microsecond pulse duration and pulse repetition time just less than half the minimum intertrain pause time but clearly greater than the minimum pause between breaks of the same impulse train. Thus if B caries SP5 indicating that an impulse break has been received and if no impulse break is present as indicated by CTP1 on PL1 a PP6 pulse is transmitted through PCG8 at XP3 and causes SP6 to be stored via DM6, DM5, DM1 and PSG5. B is also connected to pulse coincidence gate PCG10 to which XP4 and PP1 are connected. XP4 is a pulse train of 1200 microsecond pulse duration, the pulses of which immediately precede the XP3 pulses. If the SP6 pulse is stored for a complete period between an XP3 pulse and an XP4 pulse, a PP1 pulse (coincident with CTP2 and not CTP1) will be transmitted to the output lead PL4. SP6 is only stored for this period if no further dial impulse break is indicated on PL5 in this period. The appearance of a PP6 pulse on PL5 causes the deletion of SP6 at PSG5 via DM4. Thus the intertrain pause indication at PP1 on PL4 only appears after CTP1 has appeared continuously on PL1 for a period between the XP3 and XP4 pulses. PL4 is connected via DM8, DM3 and DM2 to PSG1 thus deleting SP6 and is also connected to PSG3 deleting SP5.

At the termination of a call the loop condition on L1 and L2 of CT1 is removed and CTP1 disappears from PL1. The forward loop condition on L3 and L4 is removed after an interval governed by the following timing operation. The removal of CTP1 from PL1 stops the transmission through PCG1 of PP3 pulses and therefore removes the inhibiting signal applied to PSG5 to which B, XP6 and PP3 are also connected. Thus if SP2 is stored and CTP1 disappears from PL1 a pulse is transmitted through PSG5 causing SP1 to be stored via PSG3. XP6 is a pulse train of 1200 microsecond pulse duration and of a repetition time greater than the duration of a dial impulse break or any likely spurious interruption of say 250 milliseconds.

C is connected to pulse coincidence gate PCG4 to which XP7 and PP3 are connected. XP7 is a pulse train of 1200 microsecond pulse duration and of which the pulses immediately precede the XP6 pulses. Thus if SP1 is stored for a whole interval between an XP6 and an XP7 pulse (i. e. 250 milliseconds) a pulse is transmitted through PCG4. This pulse applied directly to decoupling means DM9 deletes SP1 in PSG3 and via DM2 deletes SP2 in PSG1 and via DM4 deletes SP3 in PSG5. The deletion of SP2 removes the pulse from PL2 and thus removes the forward loop holding over L3 and L4. If after the storage of SP1, CTP1 pulse reappears on PL1 before the next XP7 pulse, SP1 is removed via PCG1 and PSG3. The output of PCG4 applied through 6 microsecond delay D73 to PL7 which is applied via DM9 and DM4 to PSG5 and via DM9 and DM3 to PSG1 and via DM9 to PSG3 thus deleting SP4, SP5 and SP6. PL7 is also connected via decoupling means DM7 to 2 microsecond delay D74 whose output is connected via pulse suppression gate PSG2 and DM7 back to its input. Thus a PP6 pulse on PL7 causes a succession of pulses to appear on PL8 the output of D74. PP6 is applied to PSG2 so that pulses coincident with CTP2 are generated on PL8 at times PP1, PP2 . . . PP6. These are used to delete the stored pulses from the rest of the regenerator at the termination of a call as will be described later. Thus the dial impulse receiver shown in Fig. 3 gives a PP1 pulse on PL6 whenever a dial impulse break pulse is received, a PP1 pulse on PL4 wherever an intertrain pause is detected and a succession of six pulses on PL8 at the termination of a call. The dial impulse counter and sender shown on Fig. 4 will now be described.

Fig. 4 shows three timing devices each of 1200 microseconds total access time but each comprising two delay lines one of 12 microseconds and one of 1188 microseconds. The first timing device comprises 1188 microsecond delay line D51 and 12 microsecond delay line D52. This is used for counting in the dial impulse trains and for sending out the regenerated dial impulse trains to line. The second and third timing devices consist of 1188 microsecond delay lines D53 and D54 together with 12 microsecond delay lines D75 and D76 respectively. These are used to count and store dial impulse trains received.

The general operation is as follows. The first impulse train is counted and stored in the first timing device, the second impulse train in the second, the third impulse train in the third and so on, but as soon as an intertrain pause indication is received the first impulse train is sent to line. When this has occurred the information in the first timing device is deleted and replaced by that in the second, which in turn is replaced by that in the third and so on. Thus the number of timing devices provided is one, plus the number of impulse trains that could be received while one impulse train is being sent. Three such additional timing devices would probably be necessary but only two are shown here for convenience, the operation of any additional ones being similar.

Information is inserted into the timing devices for circuit CT1 at times coincident with CTP2 pulses but after delays of 1188 microseconds, the information is available at the times of CTP1 pulses. The operation will now be particularly described with reference to Fig. 4.

The first dial impulse break is indicated as a single PP1 pulse (at CTP2) on PL6 which is connected to pulse suppression gate PSG70 and to pulse coincidence gate PCG70 to both of which PL9 the output of the first timing device is connected. Thus unless a coincident PP1 pulse is on PL9, the dial impulse break indication is transmitted through PSG70 and via 4 microsecond delay D55, decoupling means DM51, pulse suppression gate PSG71 to which PL9 is connected as an inhibiting stimulus and thence via pulse suppression gate PSG53 to the input of 1188 microsecond delay line D51. The first dial impulse break indication is thus stored at time PP3 in the first timing device. It goes in at time CTP2 and on the output PL10 of D51 it appears at time CTP1. PL10 is connected via pulse suppression gate PSG72 and decoupling means DM58 and thence via 12 microseconds delay line D52, pulse suppression gate PSG61 and decoupling means DM55 back to PL9 connected via PSG53 to the input of D51. PP3 is thus stored until either an indication that another dial impulse break has been received or that an intertrain pause has been received. If a second dial impulse break is indicated on PL6 it will again pass through PSG70, D55 and DM51 but as PP3 appears upon PL9 it is inhibited in PSG71 but is transmitted through pulse coincidence gate PCG55 to which the output of DM51 and PL9 are connected. The PP3 pulse from PCG55 deletes PP3 from the first timing device by inhibiting it in PSG53 and causes PP4 to be stored since the output of PCG55 is delayed in 2 microseconds delay D56 whose output is connected via DM51, PSG71 and PSG53 to the input of D51. Thus on the second break, PP3 is deleted and PP4 is inserted. Similarly on the third, PP3 is inserted and PP4 remains, on the fourth PP3 and PP4 are deleted and PP5 inserted and so on until after ten breaks PP4 and PP6 are stored. Thus the number of breaks in the impulse train is stored in the binary code using PP3, PP4, PP5 and PP6. If by some mischance an impulse train of 16 or more breaks is received no pulse is inserted at PP1 (CTP3) since PP6 is applied to PCG55 inhibiting the transmission of PP6 through it, and thus preventing interference with the operation for a second circuit using CTP2.

When a PP1 (CTP2) pulse appears on PL4 indicating that an intertrain pause has been received, it is stored in the first timing device via PL40 and PSG53. Thus, a PP1 pulse, after passing through D51 and D52 appears upon PL9 and prevents any further dial impulse break indications on PL6 from being transmitted through PSG70 but instead causes them to be transmitted through PCG70 to PL11. PL11 corresponds to PL6 but is provided as an input to the second timing device. The counting functions of PSG54, PCG53, 4 microsecond delay D59, DM53, PSG55, 2 microsecond delay D60, PCG58, PSG73, lead PL12 and 1188 microsecond delay D53 of the second timing device correspond exactly to those of PSG70, PCG70, 4 microsecond delay D55, DM51, PSG71, 2 microsecond delay D56, PCG55, PSG53, lead PL9 and 1188 microsecond delay D51 respectively of the first timing device. The output PL13 of D53 is connected via 12 microsecond delay, D75, pulse suppression gate PSG60 and decoupling means DM56 to PL12 thus completing the circulation path. The second impulse train is counted into this timing device and stored and when a PP1 pulse is stored in it the dial impulse break indication at PL11 is suppressed in PSG54 and transmitted through PCG53 to the third timing device 1188 microsecond delay D54 and 12 microsecond delay D76 where the counting of the next dial impulse train is effected in a precisely similar manner and so on for any additional timing devices provided, Meanwhile the first dial impulse train is being sent out as follows.

The storage of PP1 in the first timing device D51 and D52 is indicated on PL9 which is connected to PCG56 together with PP1. Thus when an intertrain pause has been received, PP1 appears on the output of PCG56 applied to pulse coincidence gate PCG69 to which XP5 is connected. XP5 is a pulse train of 1200 microseconds pulse duration and repetition time equal to the intertrain pause required. The output of PCG69 is connected via 2 microsecond delay D57 to PSG53 causing the storage of PP2 in the first timing device. The output of D57 is also connected to pulse coincidence gate PCG57 together with PL9 so that after the second XP5/PP1 pulse is transmitted through PCG57 which is connected to the input of the third timing device D54 and D76 thus causing the storage of PP2 therein.

The outputs of D51 and D54 together with PP2 are connected to pulse coincidence gate PCG62, so that after an interval at least equal to the required intertrain pause after receiving the intertrain pause a PP2 pulse train coincident now with CTP1 for CT1 is transmitted through PCG62 to PL14. PL14 is connected to one pulse coincidence gate for each circuit as PCG74 for CT1 to which CTP1 at time PP2 is applied on PL51. The output of PCG74 is applied as an operating lead to trigger T2 and as a suppression lead to PSG74. Thus PL51 is prevented from inhibiting trigger T2 via PSG74 and trigger T2 is operated. T2 controls relay Z so that the appearance of coincident pulses applied at PP2 from D51 and D54 causes the operation of relay Z and the short circuit loop condition to be applied to the leads L3 and L4.

PL14 is also connected to pulse coincidence gate PCG73 to which XP8 is applied. XP8 is a pulse train of pulse duration 1200 microseconds and repetition frequency of 10 per second corresponding to the dial impulse rate required. Upon coincidence between XP8 and the output of PCG62 a pulse is transmitted via pulse suppression gate PSG64 to 2 microsecond delay line D66 whose output is connected to its input via PSG64 to which PP6 is applied as a suppression. On the output PL15 of D66 a sequence of pulses is generated at times PP3, PP4, PP5 and PP6 coincident with the pulses used to store in binary form in the first timing device the pulse train indicated on PL10.

PL10 and PL15 are connected to an adding circuit in which the binary number 1111 is added to the binary number stored in the first timing devices D51 and D52 the most significant digit in the circuit being lost. Each such addition subtracts one from the stored binary number thus reducing by one the number of breaks in the impulse train remaining to be sent. Three leads PL10, PL15 and PL16 are all applied to each of three gates, pulse coincidence gates PCG63 and PCG64 and pulse suppression gate PSG72. A pulse on all three leads is transmitted through PCG63, on any two of them through PCG64, and provided a pulse is not transmitted through PCG64, a pulse on any one of them is transmitted through PSG72 to which the output of PCG64 is connected as a suppression. The outputs of PCG63 and PCG64 are connected together via decoupling means DM59 to pulse suppression gate PSG65 to which PP6 is applied and thence via 2 microsecond delay line D67 to PL16 thus performing a "carry" function, except that no PP6 pulse may be "carried." The outputs of PSG72 and PCG63 are connected together via decoupling means DM58 to PL17 the input of D52. Thus when four consecutive pulses appear on PL15, if the least significant digit stored in the first timing device is indicated by a PP3 pulse, the pulse is transmitted through PCG64 and not through either of the other gates and therefore no pulse appears on PL17 at PP3, but one does appear on PL16 at PP4. If however the least significant digit is the absence of a PP3 pulse, an output is obtained from PSG72 only, carrying a PP3 pulse to appear on PL17 and no carry pulse on PL16 at PP4. Similarly if the second digit is a 1 (presence of a pulse) PP4 is transmitted through PCG63 or PCG64 depending upon whether there is a "carry" pulse on PL16. If the second digit is a 0 (absence of a pulse) PP4 is transmitted through PCG64 or PSG72 depending upon the state of PL16, and so on, the "carry" pulse at PP6 being suppressed in PSG65. Thus, one is subtracted from the number stored at each XP8 pulse.

PL17 is also connected to 2, 4 and 6 microsecond delay lines D68, 69 and 70 whose outputs together with PL17 are connected to pulse coincidence gate PCG68 to which PP6 is also connected. PCG68 transmits a PP6 pulse if pulses appear coincidently on all five inputs thus indicating that digit 1111 has been stored i. e. that the number stored before the XP8 pulse was 0000. PL15 is connected to pulse coincidence gate PCG66 to which PP6 is applied so that when one is subtracted a PP6 pulse appears upon the output of PCG66. This is connected to pulse suppression gate PSG63 to which the output of PCG68 is applied as a suppression. The output of PSG63 is connected to the input of the second timing device D53 and D75 via PSG54, D59, DM53, PSG55 and PSG73 so that when one is subtracted PP2 (CTP2) is stored in the second timing device unless suppressed by the change from 0000 to 1111 on PL17 as indicated on the output of PCG68. The dial impulse train has thus been sent and a shifting process takes place as will shortly be described.

The storage of PP2 in the second timing device D53 and D75 is used to send a dial impulse break to line. The output PL13 of D53 is connected to pulse coincidence gate PCG75 to which PP2 is applied so that while PP2 is stored in the second timing device PP2 pulses at time CTP1 appear on PL50 the output of PCG75. PL50 inhibits the PP2 pulses on PL2 thus allowing trigger T1 and relay Y to reset and break at contact Y the forward signalling loop on L3 and L4. Contact Y remains open until PP2 is deleted from the second timing device. XP9 is a pulse train of 1200 microsecond pulse duration, the pulses of which occur a dial impulse break duration after those of XP8 (i. e. 66⅔ milliseconds later) and these pulses with PP2 are connected to pulse coincidence gate PCG76 whose output deletes in PSG73 the storage of PP2 from the second timing device D53 and D75.

Thus a train of dial impulses is transmitted to line until a pulse is generated at PP6 on the output of PCG68. This is applied via decoupling means DM75 to the input of 2 microsecond delay line D63 whose output is connected via pulse suppression gate PSG62, to which PP6 is applied, and DM75 to its input thus causing a sequence of six pulses to be generated on PL18 the output of D63 coincident with CTP2 and therefore with the circuit CT1 information on the outputs of D52, D73 etc. PL18 is connected as a suppression lead to PSG61 on the output of D52 thus deleting all the information relating to CT1 in the first storage device. It is also connected to pulse coincidence gates PCG60 and PCG61 on the outputs of D75 and D76 and similarly for any other timing devices. The output of PCG60 is connected via DM55 to PL9 of the first timing device thus causing the information held in the second timing device for CT1 to be transferred to the first timing device. This information is deleted from the second timing device by applying the six pulses on PL18 as inhibition stimuli to pulse suppression gate PSG60. Similarly the CT1 information in the third timing device (except for the PP2 pulse) is transferred to the second and so on. PL18 is connected to PCG61 together with the output of D76 and the output of PCG61 is connected via DM56 to PSG73 the input of the second timing device. However PP2 is deleted from this information since PP2 is not associated with the impulse train stored in any particular timing devices and is only used in sending out. The output of PCG 61 is also connected to pulse coincidence gate PCG77 together with PP2 and the output is connected to PSG73 as a suppression.

After the shifting process the second digit is sent via L3 and L4 once the intertrain pause indication following the sending of the first digit has been received and after the intertrain pause has been timed. The digit to be sent is always in the first timing device and the next digit in the second timing device and so on, the shift process taking place after the sending of each impulse train.

When there is no pulse on PL14 the trigger T2 is reset by PL51 via PSG74, resulting in Z relay releasing and the short circuit forward loop on L3 and L4 being removed leaving only resistor R and Y contact operated, across L3 and L4. At the termination of the call a succession of six pulses is generated on PL8 as already described and these are applied to suppression gates in each of the counting and sending timing devices thus deleting all the stored information. Thus PL8 is connected to PSG53, PSG73 and PSG58 of the three timing devices shown and at times coincident with PP1 . . . PP6 at CTP2 all the CT1 information is deleted.

It will be clear to those skilled in the art that other facilities which might be required of a regenerator may be performed using the techniques disclosed and that there are many variations of the sequential operation of it. Also many possible circuit techniques are adaptable to the functions required.

These embodiments serve as examples of how the invention may be carried into effect but it will be clear that there can be other ways of receiving dial impulses from a plurality of sources, which fall within the scope of the invention, and that there are other applications of the invention for example in the receipt of telegraph signals by a central regenerating station etc.

We claim:

1. Apparatus for the reception of pulse coded information from a number of sources in which information from source is received by the apparatus only at a predetermined time in a recurring time cycle, said apparatus comprising in combination a pulse storage system, means for inserting into the storage system a first pulse indicative of the commencement of reception of a train of pulse coded information from a source, first timing means for timing each pulse of said pulse train, means for causing the storage under the control of said timing means, of a second pulse for each pulse of the said pulse train whose duration is of a predetermined value and for producing an output characteristic of such second pulse, further means for inserting into the storage system a third pulse indicative of the commencement of an interval between successive trains of pulse coded information, means for timing the duration of storage of said third pulse and of providing a characteristic output in the event that the duration of storage is of a predetermined value, and further means for providing an output on the termination of the transmission of pulse coded information from a source.

2. Apparatus for the reception of pulse coded information from a number of sources in which information from a source is received by the apparatus only at a predetermined time in a recurring time cycle, said apparatus comprising in combination a plurality of pulse storage devices, means for inserting a pulse characteristic of a source into a first device of said devices upon the commencement of reception of each pulse of a train of pulse coded information from that source, first timing means for timing the duration of storage of each of said inserted pulses in the first device, transfer means operating under the control of first timing means to transfer said first inserted pulses to a second of said storage devices in the event that the duration of storage in the first device is of a predetermined value and to store the transferred pulses in a third of said storage devices whose output is applied to a second transfer circuit which inserts a pulse characteristic of the source into a fourth of said storage devices to indicate the commencement of an interval between successive trains of pulse coded information from the source, a second timing circuit for timing the duration of storage of the pulse in the fourth device and for providing a characteristic output in the event that the duration of storage is of a predetermined value, and further means for providing an output on the termination of a transmission of pulse coded information from a source.

3. Apparatus according to claim 2 and in which the output of the second storage device is applied to the first storage device to inhibit the storage therein of pulses coincident with pulses stored in the second device.

4. Apparatus according to claim 2 and which also comprises a counting circuit to which the output of said first storage device is applied, a plurality of output leads for said counting circuit which operates to produce a pulse characteristic of the source coincidental on a combination of the output leads representative of each train of pulse coded information.

5. Apparatus for the reception of pulse coded information from a number of sources in which information from any one source is received by the apparatus only at a number predetermined in a recurring time cycle, said apparatus comprising in combination a pulse storage system, means for inserting into the system pulses indicative of the pulse coded information from a source, timing means for timing the duration of storage of said pulses, and output producing means for providing an output characteristic of said duration.

6. Apparatus for the reception of pulse coded information from a number of sources in which information from a source is received by the apparatus only at a predetermined time in a recurring time cycle, said apparatus comprising in combination a plurality of pulse storage devices, means for inserting a pulse characteristic of a source into a first device of said devices upon the commencement of reception of each pulse of a train of pulse coded information from that source, first timing means for timing the duration of storage of each of said inserted pulses, transfer means operating under the control of said first timing means to transfer said first pulse to a second of said storage devices in the event that the duration of storage in the first device is of a predetermined value and to store the transferred pulses in a third of said storage devices whose output is applied to a second transfer circuit which inserts a pulse characteristic of the source into a fourth of the said storage devices to indicate the commencement of an interval between successive trains of pulse coded information from the source, a second timing circuit for timing the duration of storage of the pulse in the fourth device and for providing a characteristic output in the event that the duration of storage is of a predetermined value, further means for providing an output on the termination of a transmission from a source, a counting circuit to which the output of the first storage device is applied, a plurality of output leads from the counting circuit, a control gate circuit in each output lead to which the output of the fourth storage device is applied to gate the output of the counting circuit on to a combination of the output leads representative of a train of pulse coded information.

7. Apparatus according to claim 6 and further providing re-setting means for the counting circuit which operates under the control of the output of said further means to re-set the counting circuit in respect of a source.

8. Apparatus for the reception of pulse coded information from a number of sources comprising in combination means for transmitting the information from a source to the apparatus at a time characteristic of the source in a recurring time cycle, a group of position pulse trains each of which is characteristic of a particular condition and the pulses of each of which appear at the time characteristic of each source once in each cycle, a pulse storage system, position pulse train inserting circuits for receiving information from said transmitting means and inserting into the storage system a number of position pulse trains in dependence upon a received pulse code, timing circuits for timing the storage of said inserted position pulse trains and output circuits for producing outputs characteristic of the stored position pulse trains.

9. Apparatus for the reception of pulse coded information from a number of sources in which information from a source is received by the apparatus only at a predetermined time in a recurring time cycle and in which the pulse coded information received by the apparatus from a source comprising a combination of the presence of a pulse at the predetermined time for that source in some time cycles and the absence of a pulse at that time in other time cycles, and in which means are provided for distinguishing between the pulse coded information and spurious signals, said means operating to compare the duration of absence of pulses with a standard time interval.

10. Apparatus for the reception of pulse coded information from a number of sources in which information from a source is received by the apparatus only at a predetermined time in a recurring time cycle, said apparatus comprising in combination a group of position pulse trains the pulses of each of which appear at the time characteristic of each source once in each cycle, a pulse storage system, position pulse train inserting circuits for receiving information from said transmitting means, said circuits inserting one of the position pulse trains into the storage system on the commencement of transmission of a train of pulse coded information from a source, a second position pulse train on the occurrence of a first pulse in said train of pulse coded information, a third position pulse train in the event that the duration of storage of said second pulse train is of a predetermined value, a fourth position pulse train on the commencement of an interval, and a fifth position pulse train in the event that duration of storage of the fourth pulse train is of a predetermined value and output circuits for producing outputs characteristic of the stored position pulse trains.

11. Apparatus according to claim 10 in which each source is represented by a circuit pulse train, means being provided for modulating the circuit pulse train with information transmitted from a source represented by the circuit pulse train.

References Cited in the file of this patent

UNITED STATES PATENTS 2,700,148 McGuigan -------------- Jan. 18, 1955